United States Patent [19]

Asztalos et al.

[11] 4,106,796
[45] Aug. 15, 1978

[54] CONNECTOR FOR DUCT SYSTEMS FOR LOW TEMPERATURE FLUIDS

[75] Inventors: Stefan Asztalos; Alfred Stephan, both of Munich; Reinhold Mayer, Geretsried, all of Germany

[73] Assignee: Linde Aktiengesellschaft, Wiesbaden, Germany

[21] Appl. No.: 758,789

[22] Filed: Jan. 12, 1977

[30] Foreign Application Priority Data

Jan. 14, 1976 [DE] Fed. Rep. of Germany ....... 2601117

[51] Int. Cl.² ............................................. F16L 47/00
[52] U.S. Cl. ................................ 285/133 R; 285/136
[58] Field of Search ................... 285/133 A, 134, 136, 285/133 R

[56] References Cited

U.S. PATENT DOCUMENTS

| | | | |
|---|---|---|---|
| 3,137,143 | 6/1964 | Jacobs et al. | 285/47 X |
| 3,166,344 | 1/1965 | Davis | 285/134 |
| 3,173,207 | 3/1965 | Burzlaff | 285/134 X |
| 3,988,029 | 10/1976 | Gibson | 285/47 |
| 4,011,732 | 3/1977 | Doherty et al. | 285/47 X |

*Primary Examiner*—Wayne L. Shedd
*Attorney, Agent, or Firm*—Karl F. Ross

[57] ABSTRACT

A connector for a low-temperature-fluid duct comprises male and female connector members which interfit and, like the duct portions to which they are connected, have respective coaxial nested pipes including a first pipe forming a central flow passage for the deep-cooled medium, a second pipe defining with the first pipe a flow passage for a mixture of liquid and gaseous phases of this medium, a third pipe defining with the second pipe an inner vacuum chamber, a fourth pipe defining with the third pipe another flow passage for the medium, usually in a gaseous state, a fifth pipe defining with the fourth pipe an outer vacuum chamber, etc. According to the invention, the vacuum chambers of each connector member are sealed at the ends of the respective pipes and overlap the interfitting parts of the respective flow passages. One of the flow-passage pipes of one member is provided a ring seal while the other pipe of the same flow passage is formed with an axially extending sealing surface or layer cooperating with the ring seal.

13 Claims, 5 Drawing Figures

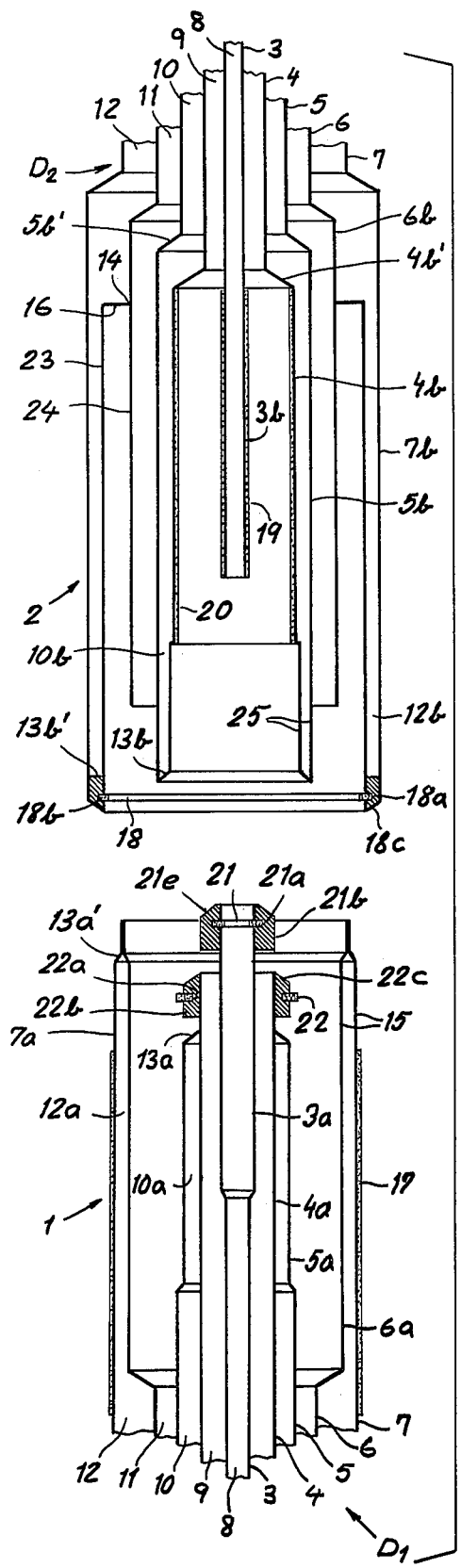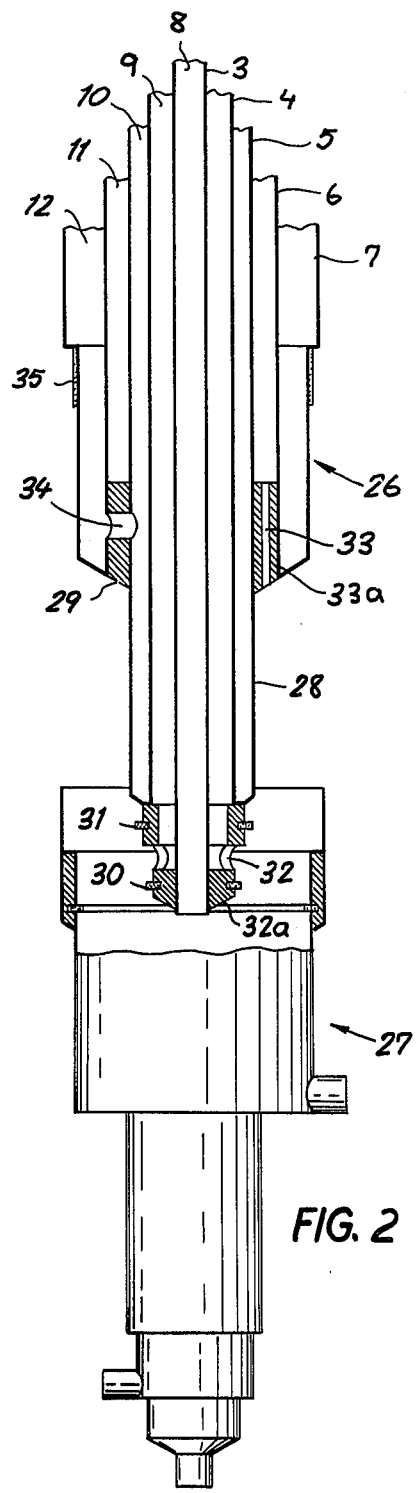
FIG. 1
FIG. 2

CONNECTOR FOR DUCT SYSTEMS FOR LOW TEMPERATURE FLUIDS

FIELD OF THE INVENTION

The present invention relates to a connector between two parts of a duct system for low-temperature media and, more particularly, to improvements in duct systems for transmitting a deep-cooled liquid from one location, e.g. a producer or storage arrangement, to another location, e.g. a consumer of the low-temperature liquid.

BACKGROUND OF THE INVENTION

For various cryogenic purposes and other uses in which a deep-cooled liquid, e.g. a liquefied gas, must be transported from one location to another, it is a common practice to provide a multi-path duct system designed to protect the deep-cooled liquid from environmental temperatures, i.e. to limit the cold losses between an upstream location and a downstream location and hence prevent the incursion of heat to the deep-cooled medium.

Such systems may be used, for example, for the delivery of liquefied natural gas from a storage vessel or liquefaction plant to a consumer, e.g. a regasification plant or a transport vessel or the like. They may also have application in the deep-cooling of articles which are to be embrittled prior to or during comminution. For instance, it is becoming increasingly advantageous to comminute used automotive vehicle tires, rubber scraps and synthetic-resin materials such as thermoplastic foils by low-temperature milling, i.e. by subjecting the articles to chilling with a low-temperature fluid, i.e. a deep-cooled liquid, and the fluid can be transported thereto by a duct system of the type under discussion from a storage tank, cryostat or other low-temperature generator (e.g. a refrigerating unit).

Still other applications will be immediately apparent. For example, various electrical apparatuses operate more effectively at cryogenic temperatures, e.g. super-conductive magnets and like devices used in particle accelerators. For the cooling of the magnetic distribution systems for low-temperature fluids, liquefied gases are usually necessary.

With all of these systems, it is important to provide a means for connecting two parts of the duct system and, since the duct system itself is generally rather complex, correspondingly complex coupling or connector arrangements have been proposed heretofore or must be fabricated on the spot.

For example, the duct systems which have been employed heretofore for the transport of a deep-cooled medium between the source and the consumer have comprised multi-path pipe arrangements using coaxial ducts to define the various flow passages and, generally, vacuum chambers which are intended to limit the incursion of heat into the systems or the loss of cold therefrom.

In conventional systems of this type, various structural and operational problems have arisen. For example, when the system was traversed by the deep-cooled medium (liquefied gas) mechanical stresses arose which affected operation of the systems. Furthermore, the cold losses at any junction or connector were significant. Finally, the construction of the connector has invariably been complicated and the sealing of the various flow passages from one another, so as to avoid heat penetration into the interior, has not been fully satisfactory. A disadvantage which, although mentioned last, is perhaps the most significant, in conventional connector arrangements for duct systems of the character described is that such systems do not permit of relative mobility of the parts of duct systems which were to be connected, either during assembly or because of thermal expansion and contraction considerations. As a result high precision in assembly and construction was required with consequent high labor and fabrication costs.

OBJECTS OF THE INVENTION

It is the principal object of the present invention to provide an improved connector for a duct system of the type described which has the smallest possible cold loss, is of simple construction, has increased versatility and is more economical than earlier systems.

Another object of the invention is to provide a connector for two parts of a coaxial duct system which obviates the aforementioned disadvantages and, in addition, permits relative mobility of the parts.

It is a further object of the invention to provide an improved duct system embodying one or more connectors of the improved construction.

Still another object of the invention is to provide a connector which facilitates branching of fluids to and from a multi-pipe coaxial duct system, especially for use in the transport of cryogenic fluids.

SUMMARY OF THE INVENTION

These objects are attained, in accordance with the present invention, in a connector having male and female connector members which can be axially interfitted and are rotationally symmetrical, each of these connector members being formed with a multiplicity of coaxial pipes generally corresponding to the pipe of a duct system to which they are attached. The pipes define an inner flow passage for the deep-cooled medium, at least two vacuum chambers and at least one additional flow passage for a low-temperature fluid between the vacuum chambers. According to the invention the vacuum chambers are sealed at the free ends of each of the connector members and overlap axially the sealing junction between the pipes forming the respective flow passages. The pipes of the two members for each flow passage are sealingly connected together to permit the flow passage to extend continuously through the connectors.

The corresponding pipes of the two members for each flow passage which are sealingly engaged upon interfitting, according to the invention, are formed with sealing means including a ring seal (annular seal of limited axial length) on one of the pipes and an axially extended sealing surface or layer on the other of the pipes, engaging the respective ring seal.

More specifically, the invention provides a connector for a coaxial multi-pipe duct having vacuum chambers and a plurality of fluid passages, the connector including a male member and a female member which can be fitted together axially. The pipes defining the vacuum chambers of the two members are sealed together at their ends, the central flow passage pipes of the two members are overlapped upon interfitting and are also overlapped by the respective vacuum chambers, and the interfitted pipes of the corresponding flow passages are sealed together by a seal formed on the one hand by an annular sealing element on one of the pipes and an axially extended sealing surface on the other pipe. The vacuum chambers of the two members likewise overlap in the axial direction.

The vacuum chambers of both coupling members and thus also of the respective parts of the duct systems are sealed with respect to one another. A defect in the vacuum isolation on one side cannot be transmitted to or have any effect on the other side and a failure of the vacuum in one of the vacuum chambers need not have any effect on the vacuum chamber of either the opposite member or the same member or duct part. This has the important advantage that the vacuum chamber need not be reevacuated whenever the connector is separated and is refitted and eliminates complex seals which have hitherto been required to seal off the vacuum chambers from the atmosphere in a separable connector.

Another important advantage of the invention, where the interfitted parts are rotationally symmetrical, i.e. symmetrical with respect to the axis of the connector, is that the members are relatively rotatable for positioning the duct parts to which they are affixed. Moreover, because of the relationship between the axially extended sealing surfaces on one member and the sealing ring on the other member for each flow passage, the members of the connector can be separated or displaced axially relative to one another over a predetermined extent without detrimentally affecting operation of the unit, i.e. without interrupting the transport of the deep-cooled medium, without breaking the vacuums and without reducing the effectiveness of the sealing means.

The ring seals which slide along and upon the extended sealing surfaces permit sealing of the flow passages relative to one another and with respect to the atmosphere without creating heat bridges.

Not only does the connector of the invention constitute a new coupling system for a multi-pipe duct which allows relative angular displacements of the parts of the duct system and relatively axial displacements thereof, but the connector also makes possible certain advantages for the system as a whole which have not been seen heretofore.

According to a particularly advantageous embodiment of the invention, in the case of an inner and an outer flow passage each surrounded by a vacuum chamber, the interconnection results in a sealing engagement of an axially extended sealing surface on the outer pipe of the vacuum chamber and the inner pipe of the inner vacuum chamber, these sealing surfaces cooperating with ring seals or corresponding pipes of the other member. The vacuum chambers in each case are extended axially beyond the respective sealing surfaces to increase the conductive heat flow path between relatively warmer and colder walls of the vacuum chambers. Thus the seals of the vacuum chambers themselves can be formed by walls spaced axially from the ends of the sealing linings which cooperate with the sealing rings when the connector is assembled.

It will be apparent, moreover, that in each of the flow passages which are sealed by the respective sealing elements (a ring seal and an axially extended sealing surface), there is a length of the flow passage which constitutes a dead zone, i.e. a region in further active fluid flow does not occur and a stationary temperature gradient is established. Since these blind chambers are relatively narrow and are at a stationary temperature gradient convective heat transport across them does not occur. This has been found to be highly advantageous for thermal insulation of the flow passages from one another.

According to another feature of the invention, at least one of the ring seals is formed at the end of one of the connecting members while at least another ring seal is formed at the end of the other connecting member on load-bearing pipes thereof. Thus, when the two members are joined together, they form a structure resistant to transverse forces even when they are telescoped outwardly to their maximum spread. Furthermore, when the ring seals are all provided at the end of the respective members, they are readily accessible for maintenance, repair or replacement of the sealing rings.

Especially high stability against radial shear force is obtained, in accordance with the present invention, when the outer ring seal is provided on the female connecting member and at least one inner ring seal is provided at the end of the male connecting member. This has been found to permit an especially effective insertion of the male connecting member into the female member and effective guidance so that the two members do not tilt radially with respect to one another.

An improved insulating effect can also be obtained by forming the inner pipe of the outer vacuum chamber as a double wall structure receiving the outer vacuum chamber of the other member. In this construction, any slight gap between the interfitting walls of these two vacuum chambers will result in annular spaces which improve the insulation effect.

Furthermore, if there is direct contact of the walls of these chambers, the heat flow is not materially increased because of the presence of a vacuum space. Finally, in this connection, the end of the vacuum chamber which is received in the double wall structure can directly abut the end wall thereof so that a fixed stop is provided for the two members in their maximum-connected position.

As has been indicated, the connector according to the invention, which is capable of sustaining relative rotation and telescoping movement of its members, can be employed with considerable advantage in a duct system for, for example, the transport of a liquefied gas or refrigerant from a cryostat to a consumer. The use of the connector permits relative radial and tangential shifting of the end point or terminal of the duct system as may be required for construction of the system and/or effective use thereof.

According to this aspect of the invention, the duct parts coupled by the connector according to the invention can be of right-angle configuration so that aligned legs of the duct parts each carry one of the two telescopingly interfittable members which seal the respective vacuum chambers from one another but permit throughflow of the fluids in each of the flow passages. To permit the duct system to be positioned angularly with respect to the cryostat and consumer, it has been found to be advantageous to provide terminal connectors which, according to the invention, have some or all of the features described above. For example, the terminal connectors can have sealed vacuum chambers, ring seals cooperating with axially extending sealing surfaces or axially extending sealing surfaces cooperating with ring seals on the complementary fitting of the cryostat or other unit. The ring seals can be provided on a block sealing the intermediate flow passage around the central flow passage and formed with a radial opening permitting communication with the intermediate flow passage while other passages or ports can be provided in sealing members for access to the various chambers and passages.

Finally it has been found to be advantageous to connect each leg of one of the angularly bent duct parts with such an axially telescoping rotatable connector as has been described previously.

More specifically, each of the end terminals of the duct system can comprise a male coupling member receivable in a female coupling member of the terminal with rotational symmetry, i.e. axial symmetry in the manner described previously. The inner and intermediate flow passages, in the case of this male connector, project axially beyond the end of the surrounding vacuum chambers of the outer vacuum chamber, which are advantageously set back from the end of the inner vacuum chamber. The fluid communication with the central flow passage can be either axial or lateral (radial) and is preferably effected through a respective ring seal.

The telescoping coupling of the connector members and the relative rotatability of the connector members permits substantially universal latitude in the positioning of the cryostat and consumer units at the end of the duct system.

Not only does the connection system of the invention have the aforedescribed advantages with respect to the functioning of the transport system for deep-cooled media and the advantageous effects on assembling a duct system previously described, but it also provides an improved heat-excluding and low-cold-loss arrangement which nevertheless can be readily disassembled, examined and adjusted as to position without interrupting the flow of the deep-cooled medium or breaking the vacuum.

Best results are obtained when the central flow passage is used to convey the liquefied gas from the cryostate to the consumer, the intermediate flow passage is used to return the gasified coolant from the consumer to the refrigerating unit or cryostat, and the intermediate flow passage is supplied with a vaporizing two-phase mixture of the liquefied gas and the gas in a vapor state. This two-phase mixture, of course, receives any heat which may penetrate the system and, at a constant temperature, transforms liquid coolant into gaseous coolant.

BRIEF DESCRIPTION OF THE DRAWING

The above and other objects, features and advantages of the present invention will become more readily apparent from the following description, reference being made to the accompanying drawing in which:

FIG. 1 is an axial cross-sectional view, drawn schematically in that wall thicknesses have been omitted for greater clarity, of the two parts of a connector according to the invention prior to the interfitting thereof;

FIG. 2 is a similar view of a terminal connector according to the invention;

SPECIFIC DESCRIPTION

Figure 5:
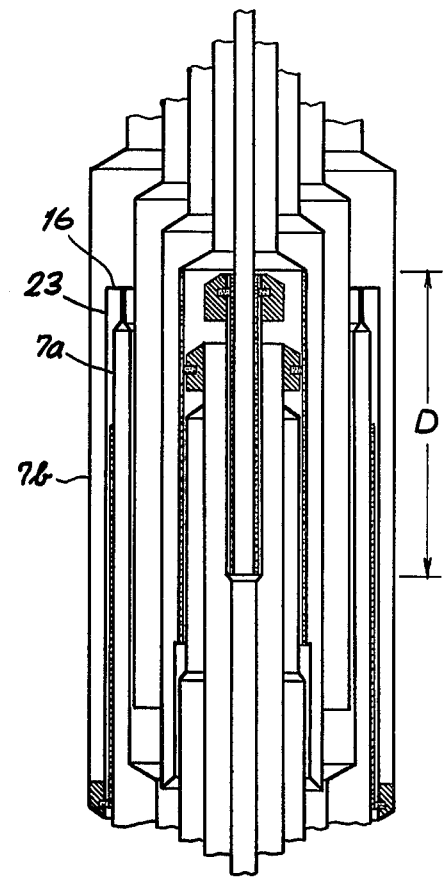
FIG. 5 shows, also in axial section and with omitted wall thicknesses, the connector of FIG. 1 with the male and female members thereof interconnected.

The connector illustrated in FIGS. 1 and 5 comprises a male coupling member 1 and a female member 2 which have been shown axially separated in FIG. 1 but interconnected in FIG. 5. The connectors are mounted upon respective parts of a duct system represented generally at $D_1$ and $D_2$, respectively, and comprising an inner or first pipe 3 traversed by the deep-cooled medium, i.e. a liquefied gas, a second pipe 4 coaxial with the first pipe and defining a flow passage 9 therewith. The flow passage 9 is traversed by a cold medium, e.g. a mixture of liquid and gas phases of the same medium traversing the central flow passage 8 formed by pipe 3. The system also includes a third pipe 5 defining with pipe 4 a first vacuum space 10 (inner vacuum chamber), a fourth pipe 6 defining with pipe 5 a third flow passage 11 traversed by another cold fluid (e.g. a gas phase of the same medium traversing passage 8), and a fifth pipe 7 defining with the pipe 6 a second vacuum chamber (outer vacuum chamber) 12.

Within the male connector member, the inner pipe 3 is extended into a tube portion 3a which coaxially receives the corresponding tube portion 3b of the female member 2 so that the inner flow passage 8 can extend axially through the connector.

The intermediate flow passage 9 of the male member 1 communicates with the corresponding flow passage 9 of the female member 2 via a tube portion 4a which fits within a tube portion 4b of the female member 2, the tube portions 4a and 4b extending the respective pipes 4 of the duct parts.

The outer flow passage 11 extends through the connector by means of a pair of tube portions 6a and 6b of members 1 and 2, respectively, welded to the respective pipes 6 and interfitting upon assembly of the coupling.

As will be described in greater detail below, an important feature of the invention is that each of the vacuum chambers terminates in the respective connector member at the end of the latter. Thus, in the case of the male member 1, the pipe 5 is extended at 5a toward the end of the connector and is sealed to the exterior of pipe 4 at 13a so that the vacuum compartment 10a in member 1 constitutes a blind extension of the vacuum chamber 10. Similarly, a seal 13a' is provided between an extension 7a of pipe 7 and the extension 6a previously described so that a blind vacuum chamber 12a extends the vacuum chamber 12 of the duct part.

As will be apparent from FIG. 5, the range of sealing interfitting of the two coupling members is represented at D and represents a stretch which is defined by sealing surfaces formed on a pipe of each of the continuing flow passages and a sealing ring engaging the surface formed on the other pipe of the two interfitting pairs of pipes which extend the flow passage through the connector. This sealing region D, which will be more easily understood subsequently, is overlapped by the extensions 10a and 12a of the vacuum chambers of the male coupling member 1.

Correspondingly, the female coupling member has various extensions as will be apparent from FIG. 1. For example, the vacuum chamber 10 is extended at 10b and is sealed at 13b by a bridge between the extension 5b of pipe 5 and the extension 4b of pipe 4. Similarly, the outer vacuum chamber 12 is extended at 12b and is closed by a seal 13b' bridging the extension 7b of pipe 7 and a pipe 23 which is sealed at 16 to the outer wall 24 of extension 5b at 14.

The system comprises various sealing arrangements between the pipes defining the flow passages. For example, the outer wall of extension 3b (central flow passage 8) is formed with a sealing layer 19 over an axial length of approximately D as represented at 19, this layer being of cold-resistant sealing material such as a soft metal or a cold-resistant elastomer or synthetic resin. The other sealing surfaces to be described may also be constituted of similar materials.

The cooperating member of the sealing arrangement for this central pipe is a sealing ring 21, which can also be composed of elastomer or a sealing metal, e.g. bronze, capable of resisting low temperatures and maintaining a seal when this ring is forced over the cylinder surface 19. The ring 21 is received in an internal groove 21a in a block 21b formed at the end of the extension 3a. As a result, the end face 21c of the block can rest, if desired, against a frustoconical transition zone 4b' between the extension 4b and the pipe 4 of the female member 2. Naturally, pipe extension 3b can be formed with the sealing ring 21 while pipe extension 3a can carry the sealing lining 19. In this case, the sealing lining 19 would be provided on the internal surface of extension 3a while the ring 21 would be provided in an external groove in an appropriate block as, for example, shown for the seal 22.

The sealing arrangement for the intermediate flow passage 9 is constituted by a lining of sealing material 20 on the internal surface of the extension 4b of pipe 4 of the female member 2, this lining cooperating with a sealing ring 22 housed in an outer groove 22a of a block 22b whose end face 22c is forced conical to abut, if desired, the frustoconical transition piece 5b' between the extension 5b and pipe 5 of the female connector member.

The seals for the two inner flow passages, therefore, utilize sealing layers on the respective pipes of the female member and ring seals on the respective pipes of the male members. However, the outer flow passage sealing arrangement is formed, according to the invention, by a sealing layer 17 applied to the exterior of the pipe extension 7a of the male member and a sealing ring 18 received in an internal groove 18a of a block 18b provided at the end of the extension 7b of the female member and, advantageously, forming the closure 13b' of the outer vacuum chamber thereof. The end face 18c of the female member 2 can be provided with a bevel to abut an appropriate frustoconical transition piece of the male member (not shown) if desired.

Simultaneously this construction, it will be seen that each connector member comprises five concentric pipes 3a, 4a, 5a, 6a, 7a, and 3b, 4b, 5b, 6b, 7b which are to be connected together. These pipes form a first central flow passage 8, a second intermediate flow passage 9, a first inner vacuum chamber 10, 10a, 10b, a third outer flow passage 11 and a second outer vacuum chamber 12, 12a, 12b.

The pipes defining the vacuum chambers 10, 10a and 10b, or 12, 12a, 12b are sealed together at their ends 13a, 13b, 13a', 13b'.

The fourth pipe 6, 6b, of the female connector 2 is divided at 14 into a concentric double pipe between the parts 23 and 24 of which a sealing zone 15 of the outer vacuum chamber of the male connector 1 is received when the two parts of the connector are axially interfitted. The sealing portion 15 of the male connector can contact member 16 previously described. The outer pipe 7, 7a of the male connector carries a sealing surface 17 which cooperates with the ring seal 18 of the female connector to seal the outer flow passage 11 against the exterior. The two inner pipes 3, 4, 3b, 4b of the female connecting members are respectively externally and internally formed with the sealing surfaces 19, 20 upon which the ring seals 21, 22 of the male connector 1 slide. Thus, the central flow passage 8 is sealed with respect to the intermediate flow passage 9 and the latter is sealed against the outer flow passage 11.

In normal operation, a deep-cooled liquid medium, usually a liquid refrigerant such as a liquefied gas, passes through the central flow passage 8, a heterogeneous mixture of vapor and liquid phases of the same medium traverses the intermediate flow passage 9 as a cold two-phase mixture. The heat which penetrates to this intermediate passage 9 vaporizes the liquid component of the two-phase mixture and thus maintains the temperature inwardly thereof (in flow passage 8 and 9) constant.

A gaseous cold medium passes through the outer flow passage and may be continuously by heat tending to penetrate the duct system. This latter medium can be the same substance as the liquid traversing the central passage 8 and can flow in the opposite direction, e.g. from the consumer to the source or generator of the liquefied gas.

Between the media traversing the outer flow passage 11 and the intermediate flow passage 9 and thus between the pipes 4 and 5 defining these passages, there is a temperature difference. There is also a temperature difference between the tubes 7 and 6/23 forming the outer vacuum chamber since tube 7 is at the temperature of the exterior while pipe 6/23 is at the lower temperature which prevails in the outer flow passage 11 and the gaseous medium traversing same.

Since the two pairs of pipes 4, 5 and 6/23, 7 are connected at seals 13a, 13a', 13b, 13b', there is the possibility of heat transmission inwardly by conduction through these seal portions. In order to reduce the heat conduction to a minimum, the sealed portions 15 and 25 of the vacuum chambers 10 and 12 are extended beyond the sealing surfaces 20, 17 so that a relatively long heat conduction path is provided. The length of this path, coupled with the relative thinness of the pipe walls, insures a minimum cold loss of heat incursion by conduction.

Moreover, when the two connector members are fitted together, there are formed between the outer vacuum chamber 12 and the pipe parts 23, 24 of the female connecting member 2, two narrow chambers in which there is no flow of the gaseous medium so that a stationary temperature gradient is formed. Heat transfer by convection cannot occur in these annular chambers. The same applies for the annular chambers which are formed during connection of the members between the pipe 5 of the male coupling member and the pipe 4 of the female coupling member.

The embodiment illustrated in FIGS. 1 and 5 is not, of course, the only possibility. In fact, this structure can be modified in various ways, some of which have been discussed briefly above. For example, the inner pipe portions 3b of the female member need not extend into the pipe portion 3a of the male member but can, conversely, receive the portion 3a with appropriate reversals of the sealing surface and ring. The same holds true for the vacuum chamber 10b which need not receive the chamber 10a of the male member but can, instead, be received therein. The ring seals can be provided differently, as already noted and, for example, a seal can be provided at the end 13a' for engagement with a sealing surface on member 23. If this modification is used, then pipe portion 3b may be formed with the sealing block 21b which can have an external ring.

FIG. 2 illustrates an end connector which can be used in a system according to the invention, only the male coupling member 26 being illustrated in detail. The associated female coupling member 27 has only been illustrated diagrammatically.

In this connector as well, the end of the outer vacuum chamber 12 and the end of the outer flow passage 11 are axially set back from the ends of the remaining chambers and flow passages by the length 28 of the duct. This length forms a heat resistance between the pipe 4 at lowest temperature and the seal 29 of the outer flow passage 11 which is at a substantially higher temperature. The flow passage 8 traversed by the deep-cooled liquid medium is sealed relative to the intermediate flow passage 9 traversed by the two-phase mixture by the annular seal 30 and a corresponding sealing surface (not shown) in the female member 27. The sealing of the two-phase mixture with respect to the gaseous phase is accomplished by the ring seal 31.

The end connector illustrated in FIG. 2 can be of the nontelescoping type such that, once the male member is plugged into the female member, the relative axial positions of the two members are maintained. In this case, the ring seals 30 and 31 can have relatively small sealing surfaces.

The two-phase mixture is laterally introduced to or removed from the flow passage 9 through a radial bore 32 in the block 32a. The gaseous medium in the outer flow passage 11 can be supplied thereto or withdrawn therefrom through an axial passage 33 in the block 33a which seals the end of the passage 11.

In this embodiment, the two vacuum chambers 10 and 11, which can be fully separate from one another as noted above, are interconnected via the bore 34 so that they can be evacuated in parallel through a fitting not shown. Sealing against the exterior may be accomplished by a sealing surface 35 on the wall of pipe 7 which can cooperate with a ring seal (not shown) at the upper end of the female member 27.

Figure 3:
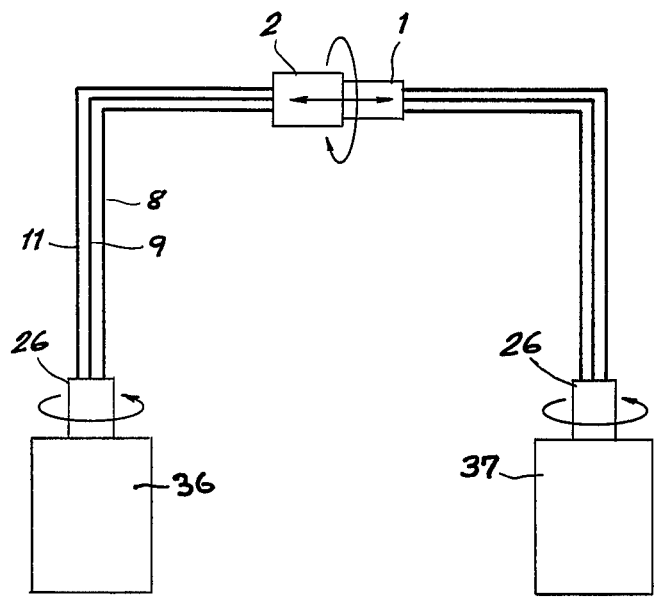
FIG. 3 is a schematic illustration of a duct system using the connectors of FIGS. 1 and 2, also illustrated diagrammatically.

FIG. 3 shows the use of the connectors of the present invention in a duct system between a cryostat 36, forming a source of the deep-cooled liquid, and a consumer 37 of the deep-cooled liquid which returns vapors thereof through the flow passage 11. The flow passages 8, 9 and 11 are here shown diagrammatically but can extend at right angles from their respective units 36, 37 to carry the coupling members 1, 2 at their interconnected legs and the coupling members 26 and their legs extending into the units 36 and 37. As represented by the arrows, the consumer 37 and the cryostat 36 can be adjusted radially and tangentially in a horizontal plane relative to one another and can be tilted with respect to one another into parallel planes. In other words, they can be moved closer together or further apart parallel to the axis of the connector 1, 2, they can be pivoted relative to one another about this axis, and they can be rotated about respective axes perpendicular to the axis of the connector 1, 2.

Figure 4:
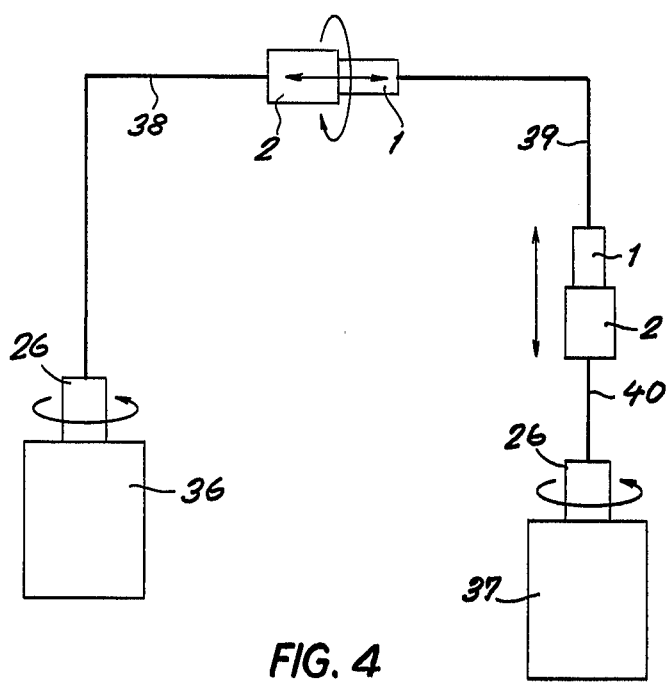
FIG. 4 is a view similar to FIG. 3 illustrating another embodiment of the invention.

FIG. 4 shows a system in which the duct portions are represented again diagrammatically at 38, 39 and 40 and are provided with connectors 1, 2 and 26. In this embodiment, however, an additional connector 1, 2 is provided between lines 39 and 40 to permit relative axial displacement of one of the units with respect to the other in the vertical direction.

We claim:

1. A connector for a multipipe duct system having two duct parts each comprising a central flow passage, and at least one vacuum chamber coaxially surrounding said flow passage, said connector comprising a male member connected to one of said parts and a female member connected to the other of said parts and telescopingly receiving said male member, said members being provided with telescopingly engaging pipe portions forming said central flow passage and further pipe portions defining said vacuum chambers, the pipe portions of said members axially overlapping upon the fitting of said members together, a ring seal on one of the overlapping pipe portions of one member, and an axially extending sealing surface on a pipe portion of the other member overlapped thereby and slidably engageable by said ring seal for sealing said flow passage against the exterior, each of said members comprising a first pipe portion telescopingly engaging the first pipe portion of the other member to form said central flow passage through the connector, a second pipe portion coaxially surrounding said first pipe portion and telescopingly engaging the second pipe portion of the other member to define an intermediate flow passage through said connector, a third pipe portion coaxially surrounding said second pipe portion and sealed thereto at the end of the respective member to form an inner vacuum chamber, a fourth pipe portion coaxially surrounding said third pipe portion and telescopically engaging the fourth pipe portion of the other member to define an outer flow passage therewith, and a fifth pipe portion coaxially surrounding said fourth pipe portion and sealed thereto at the end of the respective member to define an outer vacuum chamber, the inner vacuum chambers of said members and the outer vacuum chambers of said members overlapping upon the fitting of said members together.

2. The connector defined in claim 1 wherein the corresponding pipe portions of said intermediate and outer flow passages are provided one with a ring seal and the other with an axially extending sealing surface engaged by the respective ring seal to seal the flow passages from one another.

3. The connector defined in claim 2 wherein at least one of the pipe portions defining each of said vacuum chambers is provided with a respective such ring seal, the pipe portion defining each vacuum chamber extending axially beyond the respective ring seal toward the respective end of each member to form lengthened heat conduction paths and narrow axially extending ring zones to be filled with fluid not participating in the fluid flow and having a stationary temperature gradient.

4. The connector defined in claim 2 wherein said ring seals are provided at the ends of the respective pipe portions.

5. The connector defined in claim 4 wherein at least one ring seal is provided on each of said members.

6. The connector defined in claim 2 wherein one of each pair of overlapping vacuum chambers is formed as a concentric double wall receiving the other vacuum chamber of the pair.

7. The connector defined in claim 6 wherein said double wall is formed with a bottom and the seal of the two pipe portions defining said other vacuum chamber of the pair is adapted to abut said bottom.

8. A multipipe duct system for connecting an upstream unit with a downstream unit for transmitting a low temperature fluid between said units, said duct system having a pair of duct parts each comprising a central flow passage and at least one vacuum chamber coaxially surrounding said flow passage, and a connector comprising a male member connected to one of said parts and a female member connected to the other of said parts and telescopingly receiving said male member, said members being provided with telescopingly engaging pipe portions forming said central flow passages and further pipe portions defining said vacuum chambers, the pipe portions of said members axially overlapping upon the fitting of said members together, a ring seal on one of the overlapping pipe portions of one member, and an axially extending sealing surface on a pipe portion of the other member overlapped thereby and slidably engageable by said ring seal for sealing said flow passage against the exterior, said connector including a first pipe portion telescopingly engaging the first pipe portion of the other member to form said central flow passage through the connector, a second pipe portion coaxially surrounding said first pipe portion and telescopingly engaging the second pipe portion of the other member to define an intermediate flow passage through said connector, a third pipe portion coaxially surrounding said second pipe portion and sealed thereto at the end of the respective member to form an inner vacuum chamber, a fourth pipe portion coaxially surrounding said third pipe portion and telescopingly engaging the fourth pipe portion of the other member to define an outer flow passage therewith, and fifth pipe portion coaxially surrounding said fourth pipe portion and sealed thereto at the end of the respective member to define an outer vacuum chamber, the inner vacuum chambers of said members and the outer vacuum chambers of said members overlapping upon the fitting of said members together.

9. The system defined in claim 8, further comprising an end terminal connecting at least one of said parts to the respective one of said units and forming a plug connection therewith permitting relative rotation of said one of said parts and said one of said units, said terminal having said outer vacuum chamber and said outer flow passage set back axially from the end of said terminal, said terminal being formed with means communicating with each of said passages and ring seals sealing at least said central flow passage from said intermediate flow passage at said end of said terminal.

10. The system defined in claim 9 wherein said one of said parts is bent at right angles with said terminal formed on one leg of the bend and said connector on another leg thereof at right angles to said one leg.

11. The system defined in claim 10 wherein one such terminal is provided between each of said parts and the respective unit.

12. The system defined in claim 10 wherein said other leg is formed with another such connector.

13. In a connector for a multiple duct system having two duct parts each comprising several pipes coaxially surrounding each other and forming flow passages and vacuum chambers coaxially surrounding and separating the flow passages, said connector comprising a male member connected to one of said duct parts and a female member connected to the other of said duct parts and telescopingly receiving said male member, each vacuum chamber being closed at the end of the respective duct part by sealing of the respective two pipes forming the vacuum chamber, said members being provided with telescopingly engaging and axially overlapping pipe portions, the engaging pipe portions being provided with ring seals and cylindrical sealing surfaces, the improvement which comprises the sealing surfaces having an axial extension comparable in length with the overlapping pipe portions, thereby giving the possibility to rotate and/or extend the two engageable duct parts considerably without impairing the fluid tightness of the flow passages.

* * * * *